June 15, 1926.
1,588,399
R. ANDERSON
MOTOR OPERATED WINDSHIELD CLEANER
Filed May 21, 1923   2 Sheets-Sheet 1
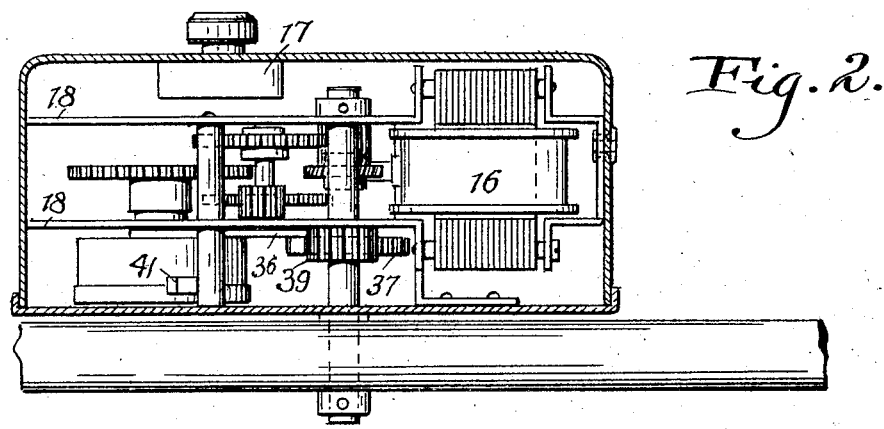
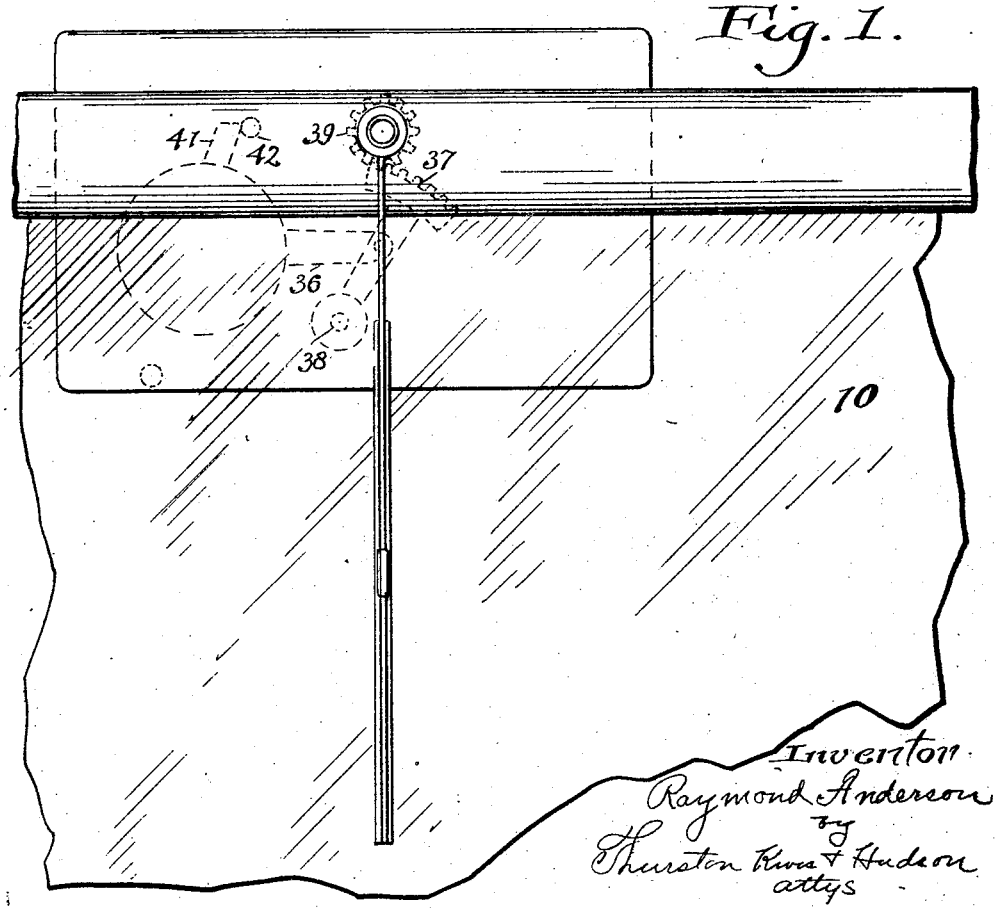

June 15, 1926.  
R. ANDERSON  
MOTOR OPERATED WINDSHIELD CLEANER  
Filed May 21, 1923   2 Sheets-Sheet 2
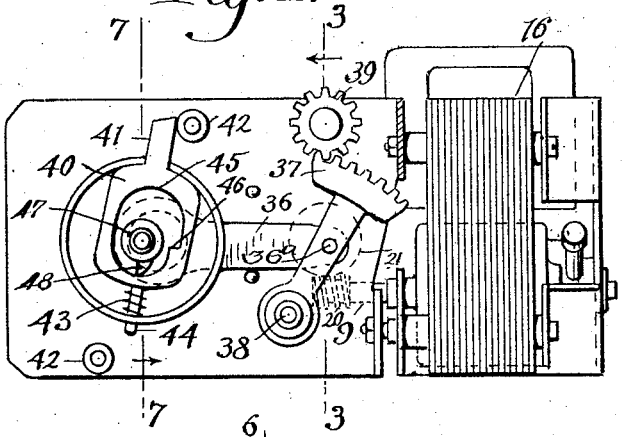
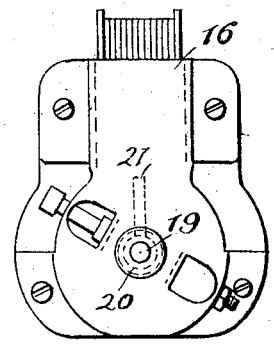
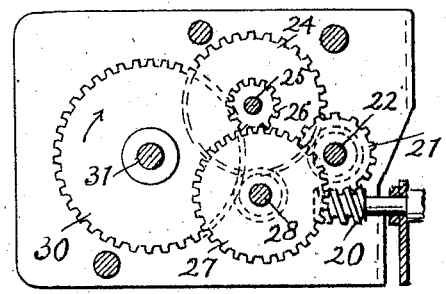
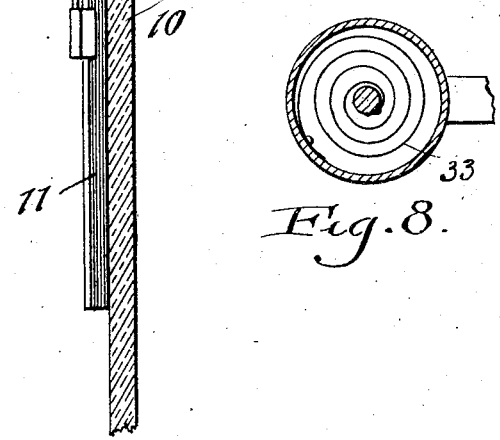
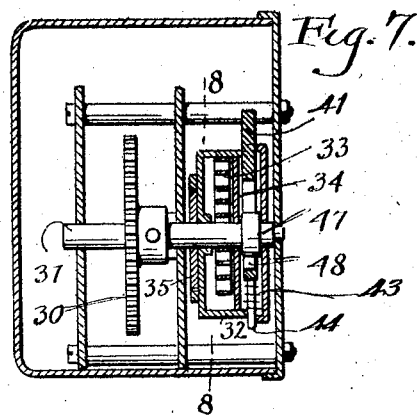
Inventor  
Raymond Anderson  
Thurston Kwis & Hudson  
attys Patented June 15, 1926.

1,588,399

UNITED STATES PATENT OFFICE.

RAYMOND ANDERSON, OF CLEVELAND, OHIO.

MOTOR-OPERATED WINDSHIELD CLEANER.

Application filed May 21, 1923. Serial No. 640,342.

This invention relates to a motor operated windshield cleaner for automobiles.

Motor driven windshield cleaners used heretofore, or proposed for use, have not been entirely satisfactory for several reasons. In the motor driven windshield cleaner most commonly used, the cleaner is oscillated continuously by a motor, but the continuous oscillating movement is objectionable because the cleaner is too frequently in front of the driver and obstructs his vision, and furthermore, the weight of the motor with the mechanism connecting it to the cleaner is excessive.

It has been proposed also to operate the windshield cleaner intermittently with the motor in the form of a solenoid having a reciprocating plunger, but this is objectionable because of the noise and vibration which is set up by the rapid reciprocation of the plunger.

The principal object of the present invention is to provide a windshield cleaner which is operated intermittently through the medium of a small continuously rotating motor which not only requires little current to run it, but is light in weight and admits of a construction which is practically noiseless and free of vibration inherent to its own construction and operation.

The invention may be briefly summarized as consisting in certain novel details of construction and combinations and arrangements of parts which will be described in the specification and set forth in the appended claims.

In the accompanying sheets of drawings illustrating the preferred embodiment of the invention, Fig. 1 is a view looking toward the outside of a windshield of a motor vehicle showing the windshield cleaner and the operating mechanism therefor on the inner side of the windshield; Fig. 2 is a top plan view of the same with the casing for the operating mechanism in horizontal section; Fig. 3 is a vertical sectional view of the same, the section being taken through the operating mechanism substantially along the line 3—3 of Fig. 4; Fig. 4 is a side view of the cleaner operating mechanism removed from the casing; Fig. 5 is an end view of the same looking toward the left of Fig. 4, and showing the motor; Fig. 6 is a sectional view substantially along the line 6—6 of Fig. 3; Fig. 7 is a sectional view similar to Fig. 3 with the section taken through the operating mechanism substantially along the line 7—7 of Fig. 4, looking in the direction indicated by the arrows; and Fig. 8 is a detail sectional view substantially along the line 8—8 of Fig. 7.

In the drawings, 10 represents the windshield of an automobile, and 11 the windshield cleaner which is mounted on an oscillatory arm 12, the stroke of which is indicated by the dotted lines of Fig. 1. The arm 12 is fixed to an oscillatory shaft 13 which in this instance extends through the bead or top frame member 14 of the windshield.

Inside the windshield and supported by the frame thereof in any suitable manner is a rectangular casing 15, which houses the operating mechanism. This operating mechanism includes a small electric motor 16 of the rotary type, i. e. having a continuously rotating armature and shaft, as distinguished from a reciprocating motor, such as a solenoid. The motor 16 is designed to be connected to and to receive current from the usual storage battery of the car, and in this instance the motor is designed to be started and stopped by a switch, indicated at 17, and having an operating handle or button projecting through the inner side of the casing, as shown in Fig. 2.

A very small electric motor can be utilized in this case with resulting low current consumption and small weight for the reason that though the motor is operated continuously when connected to the battery, the windshield cleaner is swung intermittently, the motor being utilized to store energy in a spring which is released at intervals to swing the windshield cleaner first in one direction and then the other.

At the side of the motor and secured thereto is a frame composed of a pair of parallel plates 18 which support a gear train and energy storing device. Though the particular gearing or gear train illustrated herein is not at all essential to the invention, in the embodiment shown the motor shaft which is indicated at 19, and which extends parallel to the windshield 10, has a worm 20 which drives a worm wheel 21 on shaft 22 journaled in the plates 18. This shaft carries a pinion 23 which meshes with a gear 24 on shaft 25 having a pinion 26. This pinion engages a gear 27 on shaft

28 having a pinion 29 which meshes with the gear 30 on a shaft 31 which may be termed the energy storing shaft.

This shaft 31 extends outwardly beyond the outer plate 18, and loosely mounted on the extension thereof is a drum 32 which houses a coil spring 33, the inner end of which is secured to the shaft and the outer end to the periphery of the drum. The spring is enclosed by the drum and a disk 34 which is secured to the shaft and loosely fits the inner periphery of the cylindrical part of the drum.

The drum which is normally held from rotation in the manner presently to be described, has on the inner end thereof an eccentric 35 which is engaged by an eccentric strap carried by an arm 36 connected at 36$^a$ to a gear segment 37 pivoted at 38 to one of the plates 18, this segment engaging a pinion 39 on the shaft 13 which carries the windshield cleaner.

Thus it will be seen that when the drum is released or permitted to rotate the spring will rotate the drum, and the eccentric on the back thereof will swing the segment 37 and swing the windshield cleaner, the length of the segment and the gear ratio being such that on each swing of the segment the windshield cleaner will be thrown from one dotted line position indicated in Fig. 1 to the other.

For the purpose of controlling the movement of the drum and for limiting each drum movement to substantially 180°, the drum is provided with a transversely movable latch 40 having a stop finger 41 projecting radially through a slot in the drum and adapted to successively engage a pair of stop posts 42 projecting from the outer plate 18, these posts being 180° apart. A spring 43 normally holds the finger 41 extended its maximum distance from the drum, as shown in Fig. 4, this spring surrounding an extension 44 of the latch likewise extending through the wall of the drum.

The latch 40 has an opening 45 through which the energy storing shaft 31 freely extends, this opening having a shoulder 46. Secured to the end of the shaft 31 is a sleeve 47 having a lug or cam 48 which rotates in the opening 45 of the latch, so as to engage the shoulder 46 and shift the latch so as to withdraw the finger 41 from one stop post 42, and allow the drum to ratate through half a revolution when the finger will engage the next stop post 42, it being understood that the small spring 43 will impel the finger 41 outwardly so as to engage the next post 42 as soon as the finger has been released from the first post.

Thus it will be seen that when the switch 17 is closed so as to energize the motor the latter will rotate continuously, and through the reduction gearing will continuously rotate the energy storing shaft 31. After each half revolution of this shaft the lug 48 shifts the latch out of holding engagement with one of the stationary posts, whereupon the drum is quickly rotated by the spring, giving the windshield cleaner a quick sweeping movement over the windshield, when the latch again stops the drum, whereupon the energy is again stored in the spring, and after a predetermined interval of time this energy is expended in again shifting the windshield cleaner.

It is apparent that the interval between the movements of the windshield cleaner is controlled by the speed of the motor and by the reduction gearing between the motor and the energy storing shaft, and that the interval between movements of the windshield cleaner can be varied by changing the ratio of the reduction gearing.

Inasmuch as the movements of the windshield cleaner take place intermittently or at intervals, and when the spring is released it gives it a quick movement, it is apparent that the windshield cleaner will have the least possible view-obstructing effect. Furthermore, since the motor runs continuously, and during the interval between the movements of the windshield cleaner is storing energy in the spring which actually shifts the windshield cleaner, it is apparent that a small motor can be utilized. This is important for the reason that it is highly desirable that the weight supported on the windshield be as small as possible and that the current consumption be small. Both these advantages are attained by my invention to a high degree.

Having described my invention, I claim:

1. In a motor operated windshield cleaner, an oscillatory member, a rotary motor, an energy storing shaft, reduction gearing between said motor and the shaft, a spring for shifting the oscillatory member and adapted to be wound up by said shaft, a device connected to the spring and to the oscillatory member for swinging the latter, and means for releasing said device at intervals and permitting a predetermined movement at each release.

2. In a motor operated windshield cleaner, an oscillatory member, a rotary motor for shifting the same, an energy storing shaft geared to the motor, an intermittently rotated shifting device connected to the oscillatory member, a spring between said device and shaft, a latch for holding said device against movement, and means operated by said shaft for shifting the latch so as to release said device and to permit a predetermined movement at predetermined intervals.

3. In combination in a motor operated windshield cleaner, an oscillatory member, a rotary electric motor, an energy storing shaft, reduction gearing between said motor and the shaft whereby the latter is continuously rotated when the motor is in operation, a drum loosely mounted on the shaft, a spring in said drum and connected thereto and to the shaft, a shaft on which the oscillatory member is mounted, means between said drum and the last mentioned shaft for oscillating the latter when the drum is permitted to rotate, a latch for restraining the drum against rotation, and means on the energy storing shaft for shifting the latch so as to permit a predetermined rotation of the drum by the spring, and stop devices co-operating with said latch.

4. In a windshield operating mechanism, a shaft, means for rotating said shaft, a member rotatable on the shaft, a spring connected to the shaft and to said rotatable member, a fixed stop member, a movable stop member carried by the rotatable member and adapted in one position to engage the fixed stop member, a spring for normally holding the movable stop member in stop engaging position, and means operated by the said shaft for periodically shifting the movable member in opposition to the said spring out of stop engaging position.

In testimony whereof, I hereunto affix my signature.

RAYMOND ANDERSON.